United States Patent
Neu

(10) Patent No.: US 9,671,056 B2
(45) Date of Patent: Jun. 6, 2017

(54) INSULATION

(71) Applicant: Eberspächer Exhaust Technology GmbH & Co. KG, Neunkirchen (DE)

(72) Inventor: Markus Neu, Ottweiler (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 51 days.

(21) Appl. No.: 14/210,985

(22) Filed: Mar. 14, 2014

(65) Prior Publication Data
US 2014/0262169 A1 Sep. 18, 2014

(30) Foreign Application Priority Data

Mar. 18, 2013 (DE) .................. 10 2013 204 732

(51) Int. Cl.
*F16L 59/14* (2006.01)
*F01N 13/14* (2010.01)
*F02B 77/11* (2006.01)

(52) U.S. Cl.
CPC .............. *F16L 59/14* (2013.01); *F01N 13/14* (2013.01); *F02B 77/11* (2013.01); *F01N 2450/22* (2013.01)

(58) Field of Classification Search
CPC ...... F16L 59/14; F02B 77/11; F01N 2450/22; F01N 13/14; B60R 13/08; B60R 2013/0807; B60R 13/0815; B60R 13/0838; B60R 13/0876
USPC .............................. 60/320, 323; 165/135, 136
See application file for complete search history.

(56) References Cited

U.S. PATENT DOCUMENTS

| 2,876,514 | A | * | 3/1959 | Murphy | ................ F16L 33/025 24/20 CW |
| --- | --- | --- | --- | --- | --- |
| 3,835,433 | A | * | 9/1974 | Lamprecht | .................... 337/382 |
| 4,420,062 | A | * | 12/1983 | Fukushima | .................... 181/204 |
| 6,997,662 | B2 | * | 2/2006 | Nishikawa | ......... B62D 25/2072 411/433 |
| 7,273,128 | B2 | * | 9/2007 | Niwa et al. | .................... 181/209 |
| 7,645,107 | B2 | * | 1/2010 | Yoneoka | ............. F16B 37/0857 411/433 |
| 7,856,811 | B2 | * | 12/2010 | Ell | ................................. 60/298 |
| 7,985,042 | B1 | * | 7/2011 | Paxton | ................ F16B 37/0842 411/437 |
| 8,210,786 | B2 | * | 7/2012 | Okada | ..................... F16B 37/02 411/437 |
| 9,079,274 | B2 | * | 7/2015 | Lubera | .................... F16B 37/02 |
| 2004/0083714 | A1 | * | 5/2004 | Tsuruta | ............................. 60/272 |
| 2004/0142152 | A1 | * | 7/2004 | Chen et al. | .................... 428/174 |
| 2005/0140075 | A1 | * | 6/2005 | Mishima | ................... 267/140.11 |
| 2006/0101749 | A1 | * | 5/2006 | Aota et al. | .................... 52/309.4 |
| 2007/0081928 | A1 | * | 4/2007 | Linsler | ......................... 422/179 |
| 2007/0119155 | A1 | * | 5/2007 | Tongu et al. | .................... 60/299 |

(Continued)

FOREIGN PATENT DOCUMENTS

CN 102114573 A 7/2011
DE 38 21 468 A1 12/1989

(Continued)

*Primary Examiner* — Brian Swenson
(74) *Attorney, Agent, or Firm* — McGlew and Tuttle, P.C.

(57) ABSTRACT

Insulation (10) for vehicle components, for example, exhaust systems such as particle filters and SCR systems. The insulation has a plate-like component (12). The insulation can be fasted in an especially cost-effective manner by welding. The insulation (10) has at least one separate support (16).

13 Claims, 2 Drawing Sheets

(56) References Cited

U.S. PATENT DOCUMENTS

| | | | | |
|---|---|---|---|---|
| 2007/0254135 | A1* | 11/2007 | Sturm | B60R 13/0846 428/122 |
| 2010/0287919 | A1* | 11/2010 | Yamagiwa et al. | 60/320 |
| 2011/0180174 | A1 | 7/2011 | Suzuki | |
| 2012/0132478 | A1* | 5/2012 | Reinheimer | F01N 1/00 181/212 |
| 2012/0137665 | A1* | 6/2012 | Spieth | F01N 13/1822 60/299 |
| 2013/0097838 | A1* | 4/2013 | Lacroix | B60R 13/0876 29/426.6 |
| 2014/0238648 | A1* | 8/2014 | Lehr et al. | 165/135 |

FOREIGN PATENT DOCUMENTS

| | | |
|---|---|---|
| DE | 60 2004 002 06 T2 | 1/2007 |
| EP | 1 528 231 A1 | 5/2005 |
| EP | 1 772 603 A1 | 4/2007 |
| EP | 2 348 206 A2 | 7/2011 |
| JP | S59 136521 A | 8/1984 |
| JP | H09-248671 A | 9/1997 |
| JP | 2005-133594 A | 5/2005 |
| JP | 2005-273542 A | 10/2005 |
| JP | 2007-260707 A | 10/2007 |

* cited by examiner ns, is, in

INSULATION

CROSS REFERENCE TO RELATED APPLICATIONS

This application claims the benefit of priority under 35 U.S.C. §119 of German Patent Application DE 10 2013 204 732.0 filed Mar. 18, 2013, the entire contents of which are incorporated herein by reference.

FIELD OF THE INVENTION

The present invention pertains to insulation, especially for vehicle components, for example, exhaust system components, such as particle filters and SCR systems. The present invention pertains, in addition, to an exhaust system component, which is equipped with such insulation. Such insulation (such an insulation component/assembly) has at least one plate-like (plate) component. This is designed in prior-art insulation components/assemblies, in most cases, as an especially thin sheet metal piece, which usually has a structured, for example, corrugated or studded surface.

BACKGROUND OF THE INVENTION

Prior-art insulation has especially the drawback that it is very complicated and very costly to fasten the insulation to the vehicle component to be insulated, because insulation components/assemblies are mainly screwed on, because the very thin plate-plate components of prior-art insulation cannot be welded or their welding requires great efforts, for example, by means of spots. A plurality of holes would have to be drilled in the insulation at first for preparation for a screw connection, after which a plurality of screws would have to be screwed in one after another.

SUMMARY OF THE INVENTION

The object of the present invention is to provide a novel insulation component/assembly, which can be fastened in an especially simple manner, rapidly and in a cost-effective manner, especially by means of welding.

According to the invention, vehicle component insulation is provided comprising a plate component and at least one separate support connected to the plate component.

According to another aspect of the invention, a vehicle exhaust system component is provided comprising a component outside and insulation comprising a plate component and at least one separate support connected to the plate component. The insulation is provided on the component outside, wherein the plate component is fastened on the component outside by the support by a support to component outside fastening connection.

According to still another aspect of the invention, a vehicle exhaust system insulation assembly is provided comprising a plate component with an outer edge and at least one separate support connected to the plate component. The separate support has a recess with an inner edge and the outer edge of the plate component is arranged in the recess in an installed position and a section of the outer edge of the plate component is in contact with the inner edge of the recess of the support in an installed position.

The object is accomplished according to the present invention by the fact that the insulation according to the present invention has at least one separate support in addition to the plate-like component.

The separate support according to the present invention may preferably have the same material as the plate-like component, especially metal. Furthermore, the support may comprise other weldable materials, for example, thermoplastics, glass and/or glass fibers.

The separate support according to the present invention may preferably have fastening means. The fastening means may preferably be designed for fastening the plate-like component.

The fastening means may especially preferably comprise first means for mechanically detachable fastening. For example, the support may comprise snap, Velcro, screw and clamping connections.

To achieve an especially rapid and simple fastening, the first means for mechanical fastening may comprise at least one clamping section. Fastening of the plate-like component can be achieved in this manner by pushing an outer edge thereof into the clamping section.

The support may now itself form the clamping section or be designed as such.

According to a variant, the clamping section may have at least two legs and be designed as a U-shaped clamping section. A plate-like component inserted between the legs can be clamped in the installed position by means of the legs. This U-section may be able to be manufactured especially preferably by folding a piece of sheet metal, for example, a rectangular piece of sheet metal.

These legs may be straight legs. According to one variant, the legs may have an arched section in order to make it possible to push in the plate-like component in an especially simple manner and to produce a stronger clamping action.

According to one variant, the legs or support may comprise, in addition, at least one projection, which faces the plate-like component inserted into them and which may be preferably formed on the inner side of a leg or of the support in order to prevent the plate-like component from slipping in the installed position. The projection may especially preferably comprise herefor a pointed section. Furthermore, the support or legs may have a rough and/or rubber-like (elastomeric) surface.

The support may especially preferably have an elongated shape in relation to an outer edge of the plate-like component in the installed position. The legs described may preferably also have such a shape, so that an especially good clamping action can be achieved by the fact that especially long sections of the plate-like component can be clamped in the installed position into the support or legs. The support or legs may have a length of, for example, 5 mm to 500 mm, and the length can be adapted to the dimensions of the plate-like component.

The support or legs extend, moreover, at right angles to the outer edge of the plate-like component in the installed position, so that the support or legs cover a notch section of the plate-like component in the installed position in order to achieve an especially good clamping action. The support or legs may have a width of, for example, 5 mm to 500 mm.

According to a preferred variant, the support may comprise, moreover, a weldable section, especially MAG arc-weldable sections. Permanent connection can thus be achieved by welding at the support. The support may comprise especially preferably weldable materials, such as metal, thermoplastics and glass or glass fibers for this. Furthermore, the support may have a material thickness of at least 0.1 mm to 5 mm.

The plate-like component may especially preferably likewise comprise metal, thermoplastics and/or glass or glass fibers. The plate-like component may have a material thickness of 0.1 mm to 2 mm. Since the plate-like component itself may have a very small material thickness, the MAG arc welding of a very thin plate-like component is also possible now by means of the support, since the material thicknesses of the support and the plate-like component add up in the installed position.

The support may especially preferably have, besides, a recess, which is arranged such that a section of the outer edge of the plate-like component, which section is received in the support, is arranged in the recess.

The recess may have, for example, a rectangular edge. The recess may be designed especially preferably such that the outer edge of the plate-like component is in contact with an inner edge of the recess in the installed position. The outer edge of the plate-like component can be welded together in this manner with the support in the installed position, especially by MAG arc welding, with only one seam. Furthermore, the plate-like component can be fastened in this case to the support and support to the respective exhaust system component with one seam only.

The recess may especially preferably extend in the installed position into the vicinity of the vehicle component at which the insulation is to be arranged. The recess may extend for this, for example, at least partially along a central axis of the support or be formed in the immediate vicinity of a central axis of the support.

If the vehicle component likewise comprises a weldable material, the support, the plate-like component and the vehicle component can be connected by means of welding, especially by means of only one MAG arc weld seam.

A MAG weld connection can also be achieved especially rapidly and simply in the insulation according to the present invention due to the separate support, which can be clamped rapidly and simply onto the plate-like component.

The vehicle component according to the present invention, which is preferably an exhaust system component, is characterized by at least one such insulation of the above-described type, whose plate-like component is fastened to an outer side of the component by means of at least one support.

It is apparent that the above-mentioned features, which will also be explained below, can be used not only in the particular combination indicated, but in other combinations or alone as well, without going beyond the scope of the present invention.

A preferred exemplary embodiment of the present invention is shown in the drawings and will be explained in more detail in the following description, wherein identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figures 1, 2:
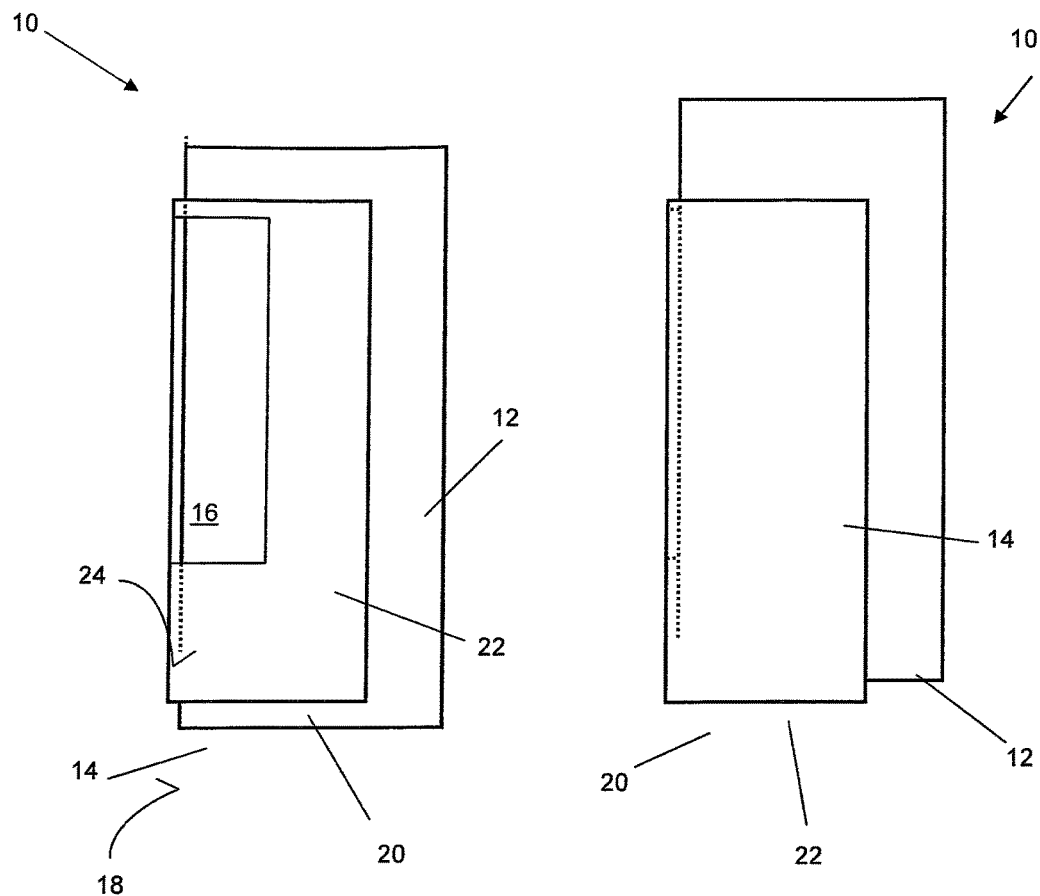
FIG. 1 is a top view of the preferred embodiment of the insulation according to the present invention.
FIG. 2 is a bottom view of the embodiment according to FIG. 1 (with the embodiment rotated 180° such that the features line up with the same features of FIG. 1)
Figure 3:
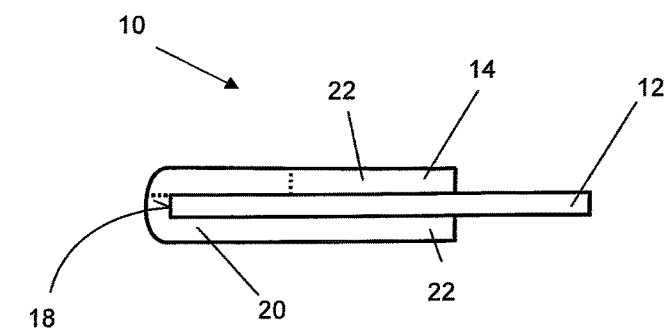
FIG. 3 is an enlarged end view of the embodiment according to FIGS. 1 and 2.
Figure 4:
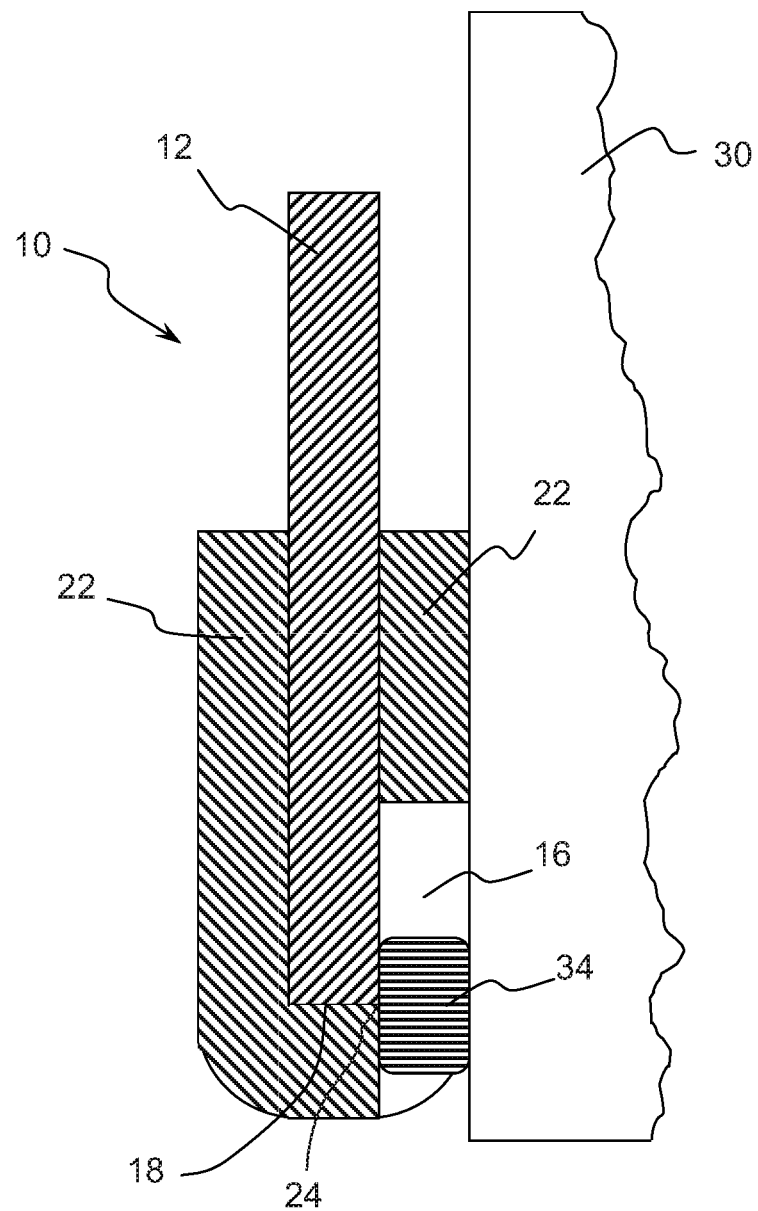
FIG. 4 is a view showing the insulation arrangement and weld in section connected to a component outside.

Referring to the drawings in particular, corresponding to FIGS. 1 through 3, the preferred embodiment of the insulation 10 has a plate-like component 12 and, in addition, at least one separate support 14.

The plate-like component 12 is made of a very thin sheet metal with a material thickness of, e.g., 0.1 mm to 2 mm.

This separate support 14 has a recess 16, wherein an outer edge 18 of the plate-like component 12 is arranged in the recess 16 in the installed position.

The separate support 14 has fastening means, which comprise a clamping section 20 in this case. The clamping section 20 has two legs 22 and is designed as a U-shaped clamping section 20 with an inside area. The legs 22 have a length of, e.g., 75 mm and a width of, e.g., 10 mm. An outer edge 18 of the plate-like component 12 is clamped in the inside area between the legs 22 in the installed position, shown in FIGS. 1 through 4.

The support 14 is made of metal, has a material thickness of, e.g., 0.5 mm and is weldable. The support 14 can be manufactured in this case by folding a rectangular sheet metal element having a length of 75 mm and a width of 20 mm at a central longitudinal axis.

The recess extends through one of the legs 22 from an outside of the support 14 to or into the inside area of the U-shaped clamping section. The intersection or joining of the recess 16 with the inside area of the U-shaped clamping section results in an edge 24. The separate support 14 is designed such that a section of the outer edge 18 of the plate-like component 12 is in contact with an edge 24 of the support 14 in the installed position. The edge 24 is also considered a part of a base of the U-shaped clamping section 20. A permanent connection of the insulation 10 according to the present invention and a vehicle component 30, which is in contact therewith, is possible in this manner rapidly and simply by means of a MAG arc weld seam 34 along the outer edge 18 of the plate-like component 12 and the edge 24 of the support 14, because welding, e.g., at weld 34, of the very thin plate-like component 12 is made possible by the applied material thickness of support 14.

Since the support 14 can be clamped onto the plate-like component 12 very rapidly and simply on the edge and the permanent connection to a vehicle component is already possible with a weld seam as described, the present invention provides insulation 10 which can be fastened especially simply, rapidly and in an especially cost-effective manner, since the insulation 10 according to the present invention can be fastened more rapidly and with a smaller number of work steps and therefore also in an especially cost-effective manner especially compared to fastening means of screw connection.

While specific embodiments of the invention have been shown and described in detail to illustrate the application of the principles of the invention, it will be understood that the invention may be embodied otherwise without departing from such principles.

APPENDIX

1. Having at least one plate-like component (12) and carrier (14), a heat-insulating means for a vehicle component (26) (10). The carrier (14), sheet-like member has two protrusions are shaped bent in cross section U-shaped (22), the plate-shaped part inside of the two protrusions (22) (12) partially disposed of, having a cutout (16) in said bent portion. The cutout (16), the outer edge (18) of the protrusion (22) while said plate-like element which is placed in contact with the inner wall of the (12), said plate-like element (12) is mounted thermal insulation means which is shaped to expose the inner edge of the inner wall (24) (10).

2. The inner edge (24), said two insulating means according to claim 1 which protrudes from the outer edge of the inside disposed the plate-like component (12) (18) of the protrusion (22) (10).

3. The carrier (14) and the plate-like component (12), said inner edge (24) and with a weld seam (28) along said outer edge (18), is connectable said vehicle component (26) thermal insulation means according to claim 1 or claim 2 are (10).

4. The two protrusions (22) are to claim 1 constituting the tightening portion of the cross section U-shaped fastening the inside disposed the plate-like part (12) of the two projections (22) (20) thermal insulation means according to any one of claims 3 (10).

5. The carrier (14), thermal insulation means (10) according to any one of claims 1 to 4 with a wall thickness or material thickness greater than the plate-like component (12).

6. At least one thermal insulation means according to any one of claims 1 to 5 (10) having on the outer (30), a vehicle component is an exhaust system components (26). Before Stories board member (12), by welding, the vehicle parts to be fastened to the outer (30) with said carrier (14).

7. The vehicle parts as an exhaust system parts to a method of thermal insulation. Sheet-like member is a shape which is bent in cross section U-shaped two protrusions have a (22), disposed inside a portion of the plate part (12) of said two protrusions (22) by using a carrier (14) having a cutout (16) in said bent portion. By said notch (16), an outer edge (18) of the protrusion (22) while said plate-like element which is placed in contact with the inner wall of the (12), wherein the inner edge of the carrier (14) and (24) to expose the, Method of attaching the carrier (14) and the plate-like component (12), using said inner edge (24) and said outer edge (18) weld seam (28) along, to the vehicle component (26).

What is claimed is:

1. A vehicle exhaust system insulation assembly comprising:
   a plate component with an outer edge;
   at least one separate support connected to said plate component, said separate support having two legs and a base forming a U-shaped clamping section, said plate component being arranged in said U-shaped clamping section, said separate support having a fastening means fastening said separate support to said plate component, wherein said separate support has a recess in one of said two legs, said outer edge of said plate component being arranged adjacent to said recess and a section of said outer edge of said plate component is in contact with said base at an inside area of said U-shape clamping section in an installed position, said base defining a portion of said recess;
   a vehicle component outside;
   a connection arranged between, and connecting, said outer edge, said support and said vehicle component outside, said connection directly contacting said outer edge, said support and said vehicle component outside, said connection being a weld that directly contacts said outer edge, said base of said U-shape clamping section and said vehicle component outside.

2. A vehicle exhaust system insulation assembly in accordance with claim 1, wherein said support comprises a weldable section.

3. A vehicle exhaust system component in accordance with claim 1, wherein:
   said recess in said one of said legs extends from an outside of said support into said inside area of said U-shaped clamping section, a portion of said plate component in said inside area defining one part of said recess position;
   said recess also extending completely through a corner formed at an intersection of said base and said one leg.

4. A vehicle exhaust system insulation assembly in accordance with claim 3, wherein said fastening means arranges said two legs to be biased towards each other and against said plate component to fasten said separate support to said plate component.

5. A vehicle exhaust system component comprising:
   a plate component with an outer edge;
   a support connected to said plate component, said support having two legs forming a U-shaped clamping section defining an inside area, said outer edge of said plate component being arranged in said inside area, said support defining a recess extending through one of said legs from an outside of said support to said inside area of said U-shaped clamping section, a portion of said plate component in said inside area defining one part of said recess;
   a vehicle component outside, said vehicle component outside is arranged on a side of said one leg that is diametrically opposite said inside area of said U-shaped clamping section; and
   a connection arranged between, and connecting, said outer edge, said support and said vehicle component outside.

6. A vehicle exhaust system component in accordance with claim 5, wherein:
   said support is a separate structure from said plate component.

7. A vehicle exhaust system component in accordance with claim 5, wherein:
   said two legs forming said U-shaped clamping section are arranged to be biased towards each other and against said plate component when said plate component is arranged in said U-shaped clamping section.

8. A vehicle exhaust system component in accordance with claim 7, wherein:
   said outer edge of said plate component is arranged in contact with a base of said U-shape clamping section;
   said connection is a weld that directly contacts said outer edge, said base of said U-shape clamping section and said vehicle component outside.

9. A vehicle exhaust system component in accordance with claim 5, wherein:
   a base of said U-shaped clamping section forms an edge next to said recess, said outer edge of said plate component being in contact with said edge of said U-shaped clamping section when said outer edge is arranged in said U-shaped clamping section.

10. A vehicle exhaust system component in accordance with claim 5, wherein:
    said outer edge of said plate component is arranged in contact with a base of said U-shape clamping section.

11. A vehicle exhaust system component in accordance with claim 10, wherein:

said connection directly contacts said outer edge, said base of said U-shape clamping section and said vehicle component outside.

12. A vehicle exhaust system component in accordance with claim 5, wherein:

said connection directly contacts said outer edge, said support and said vehicle component outside.

13. A vehicle exhaust system component in accordance with claim 5, wherein:

said connection is a weld.

* * * * *